(12) United States Patent
Mai (10) Patent No.: US 7,527,407 B2
(45) Date of Patent: *May 5, 2009

(54) OPTIC FILM AND BACKLIGHT MODULE USING SAME

(75) Inventor: Chien-Chin Mai, No. 6, Gongye 2nd Rd., Renwa Shiang, Kaohsiung County 814 (TW)

(73) Assignees: Gamma Optical Co., Ltd., Kaohsiung County (TW); Chien-Chin Mai, Kaohsiung County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/563,695

(22) Filed: Nov. 28, 2006

(65) Prior Publication Data

US 2008/0123363 A1 May 29, 2008

(51) Int. Cl.
*F21V 7/04* (2006.01)
(52) U.S. Cl. .................. 362/606; 362/339; 362/627
(58) Field of Classification Search .............. 362/330, 362/332, 339, 606, 607, 614, 615, 617, 618, 362/619, 620, 623, 624, 627; 359/599; 385/146
See application file for complete search history.

(56) References Cited

U.S. PATENT DOCUMENTS

| 6,354,709 | B1 * | 3/2002 | Campbell et al. | 362/627 |
| 7,128,456 | B2 * | 10/2006 | Yamashita et al. | 362/606 |
| 7,397,605 | B2 * | 7/2008 | Mai | 362/620 |
| 2006/0146571 | A1 * | 7/2006 | Whitney | 362/615 |

FOREIGN PATENT DOCUMENTS

JP    09292532 A   * 11/1997

* cited by examiner

*Primary Examiner*—Y My Quach Lee
(74) *Attorney, Agent, or Firm*—Leong C. Lei (57) ABSTRACT

An optic film includes a surface on which a plurality of densely distributed rib-like light guides is formed. Among the light guides, some are straight linear, while the others are of a continuous left-and-right wavy configuration. Thus, when light passes through the optic film and is converged thereby, the converged light is not completely in a regular distribution. In a backlight module using the optic film, light emitted from the backlight module does not cause diffraction and thus interference pattern is prevented from occurring.

28 Claims, 7 Drawing Sheets

OPTIC FILM AND BACKLIGHT MODULE USING SAME

BACKGROUND OF THE INVENTION (a) Technical Field of the Invention

The present invention relates to an optic film and a backlight module using the optic film, and in particular to an optic film that converges and transmits light in such a way that the light emitted is not of a full linear and regular distribution.

(b) Description of the Prior Art

Conventional backlight modules have been of such an improvement that a light source supplied by the conventional backlight module is converted from a linear light source into a surface light source. However, the light source is still subject to the constraints imposed by the regularity of prism ribs formed on an optic film that constitutes in part the backlight module. Thus, light from the conventional backlight modules is emitted in the form of regular straight beam. On the other hand, a liquid crystal display panel comprises thin-film transistors and color filters that are of minute matrixes arranged in an opposing manner. Thus, when the regular straight beam passes through gaps between units of thin-film transistors and the color filters, diffraction of light occurs, which forms interference patterns in the liquid crystal display panel. And as a consequence, the performance of the liquid crystal display is damaged.

Occurrence of the interference patterns in a specific liquid crystal panel cannot be identified in the site of backlight module manufacturers, and can only be found when a liquid crystal panel in which the backlight module is mounted is actuated. This often causes problems between the backlight module suppliers and the manufacturers of liquid crystal display panels, and is a trouble of pressing need to be overcome.

Therefore, it is desired to provide a backlight module that overcomes the problems discussed above.

SUMMARY OF THE INVENTION

The primary purpose of the present invention is to provide an optic film having two surfaces of which one forms densely distributed rib-like light guides, wherein some of the light guides are straight linear light guides, while the others are of a continuous left-and-right wavy configuration. Thus, some light guides are straight linear and the others are continuous left-and-right wavy light guides, both being formed on one surface of the optic film. When light transmitting through the optic film, the light is subject to convergence caused by the rib-like light guides. Since some of the light guides are straight linear and the others are left-and-right wavy, the light emitted from the optic film is not of a full regular distribution and instead containing linear component and continuous left-and-right wavy component.

Another objective of the present invention is to provide a backlight module using the optic film, wherein the optic film is arranged on a light emitting surface of a light guide board of the backlight module. The light emitting surface of the light guide board forms a plurality of prism-like light guides which the surface of the optic film that has the rib-like light guides opposes with the direction along which the rib-like light guides of the optic film extend substantially transverse to the direction along which the prism-like light guides of the light guide board extend. Light traveling through and subject to convergence by the prism-like light guides of the light emitting surface in one direction is further subject to convergence by the rib-like light guides of the optic film in a different direction before it is finally emitted from the backlight module so that the light emitted from the backlight module can be converged in all directions and the light emitted contains not just straight linear light that is of a very regular distribution, and instead containing both light components of both straight linear configuration and continuous wavy configuration. Such a feature prevents the light, when passing through a liquid crystal display panel, from inducing interference patterns, which deteriorates the performance of displaying of the liquid crystal display panel.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
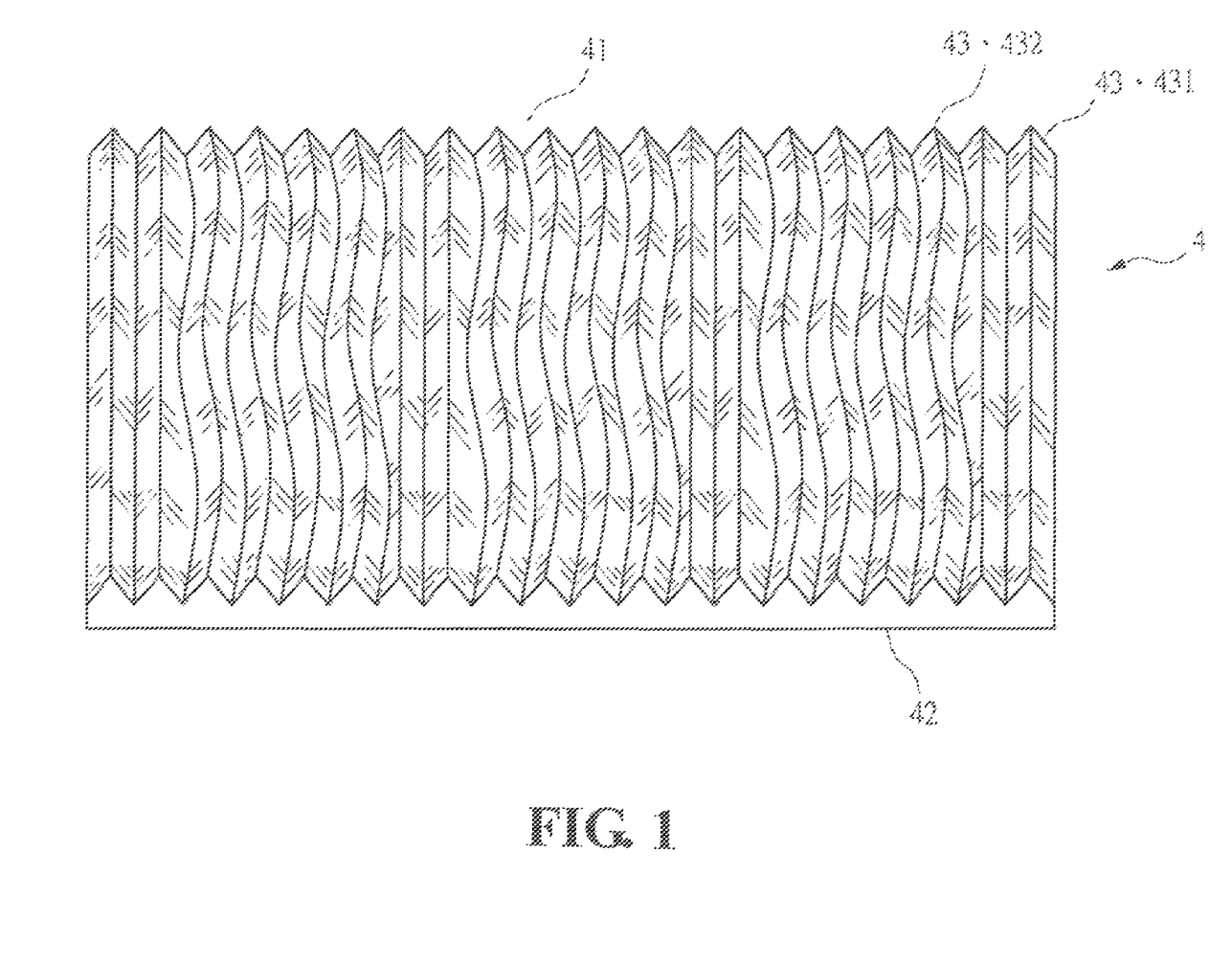
FIG. 1 shows a perspective view of an optic film constructed in accordance with the present invention.

With reference to the drawings and in particular to FIG. 1, the present invention relates to an optic film and a backlight module using the optic film, wherein the optic film 4 is made of a material that has excellent light transmittance and has a first surface 41 and a second surface 42. The first surface forms a plurality of densely distributed rib-like light guides 43 having predetermined lengths extending on the first surface 41. Some of the rib-like light guides 43 are of straight linear light guides 431, while some are light guides 432 having a continuous left-and-right wavy configuration, both being lined up and juxtaposing each other on a top of the first layer.

Figure 2:
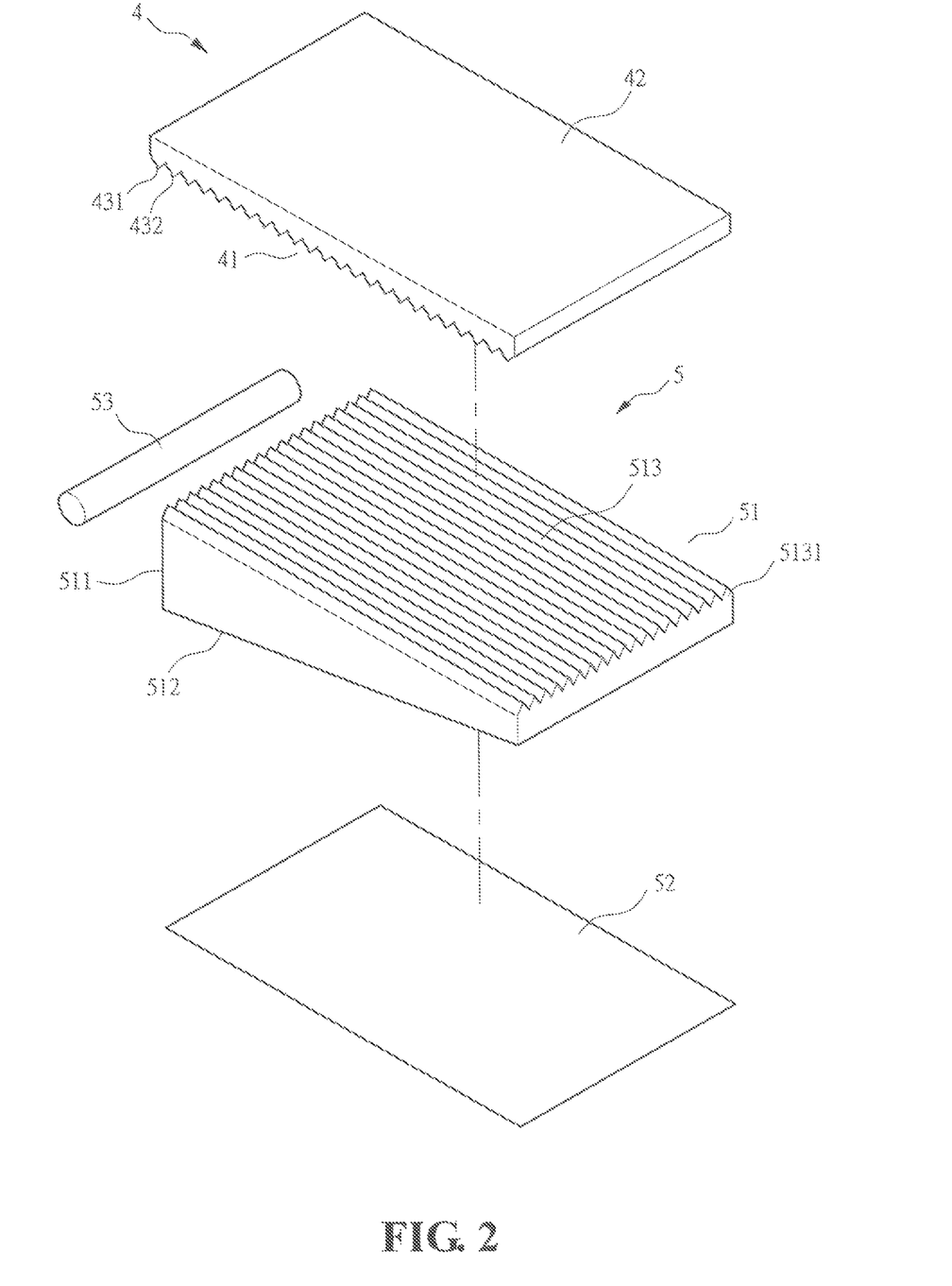
FIG. 2 shows an exploded view of a backlight module in which in which an optic film in accordance with the present invention is incorporated.

FIG. 2 shows the optic film 4 in accordance with the present invention incorporated in a backlight module 5. The backlight module 5 comprises at least a light guide board 51 made of a material that has excellent light transmittance, such as polymethyl methacrylate (PMMA), a reflector film 52, and a light source 53, wherein the light guide plate 51 has at least a light incidence surface 511 which receives light from the light source 53 and allows the light to transmit into interior of the light guide board 51 through the light incidence surface 51, a reflection surface 512 serving to reflect lights with the reflector film 52 arranged outside the reflection surface 512 of the light guide board 52 to reflect and guide light escaping from the reflection surface 512 back into the light guide board 51, and a light emitting surface 513 through which light from the interior of the light guide 51 emits outward and which forms a plurality of densely distributed prism-like light guides 5131 to effect directional convergence of the light leaving the light guide board 51. The optic film 4 of the present invention is arranged at the light emitting surface 513 of the light guide board 4 in such a way that, in practice, a first surface 41 of the optic film 4 opposes the tight emitting surface 513 of the light guide bard 51 with rib-like light guides 43 substantially transverse to the direction along which the prism-like light guides 5131 of the light guide board 51 extend, whereby light that is originally subject to convergence in one direction by the light guide board 51 is further converged in another direction. As such, two slope edges of each rib-like light guide 43 of the optic film 4 can effect convergence on the light transmitting therethrough, wherein the light transmitting through the straight linear light guide 431 is emitted as a linear light from the optic film 4, while the light transmitting through the linear guide 432 of continuous left-and-right wavy configuration is emitted as light of continuous left-and-right wavy configuration from the optic film 4. Thus, light that transmits through the optic film 4 of the present invention can maintain consistency of propagation in the normal direction to ensure convergence of light, while the light emitted does not just contain straight linear light but contains both components of straight linear light and light of continuous curving.

Figure 3:
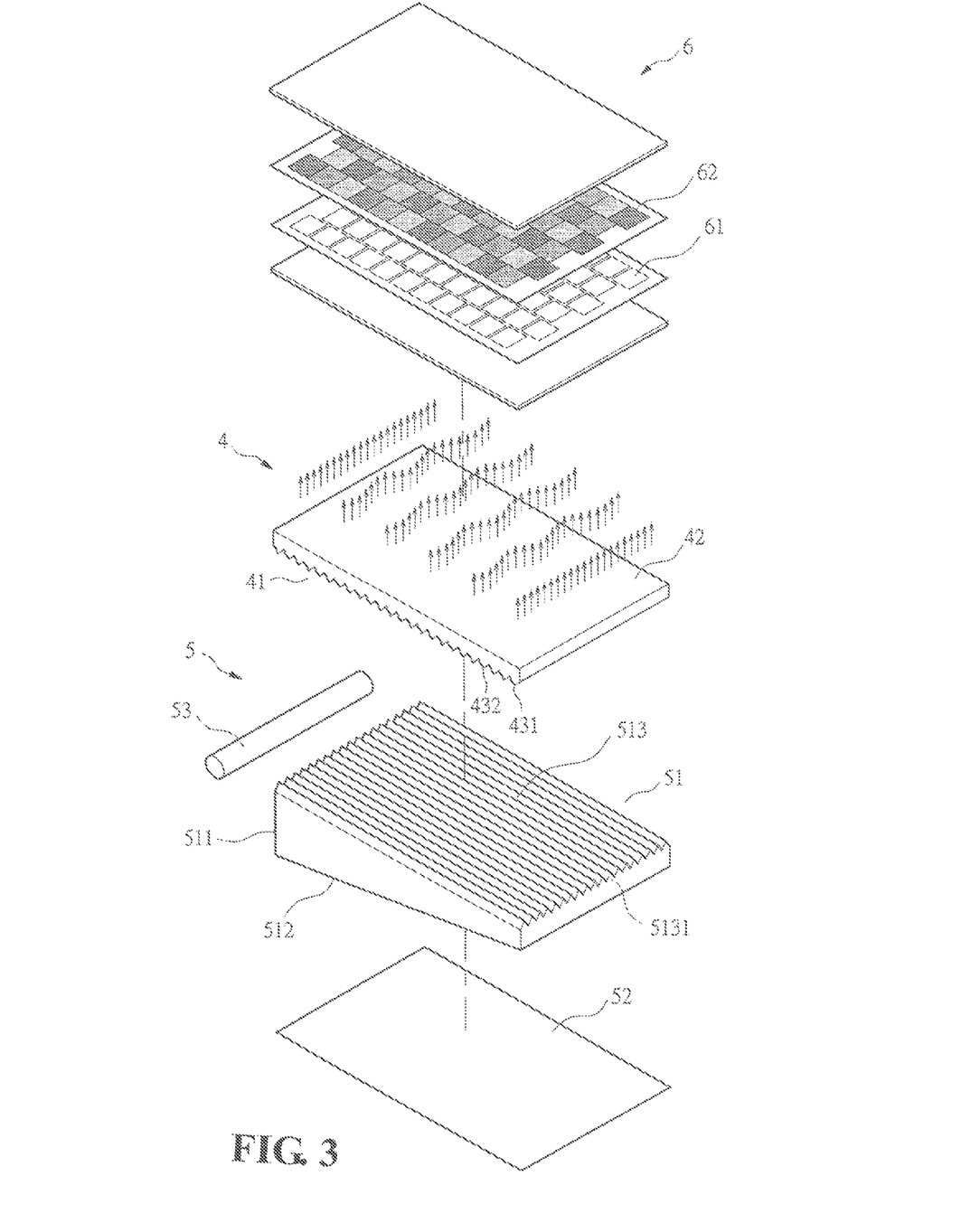
FIG. 3 is an exploded view illustrating a liquid crystal display panel in which the backlight module of the present invention is incorporated.

Also referring to FIG. 3, when the backlight module using the optic film 4 of the present invention is used in a liquid crystal display panel 6, since the light of the backlight module 5 is subject to effect caused by the optic film 4 of the present invention, the light emitted comprises both a straight linear component and a continuous curved component. Thus, when the light passes through thin-film transistors 61 and color filters 62 of the liquid crystal display panel 6, although gaps among all units of the thin film transistor 61 and all units of the color filters 62 are of regular distribution, since the light itself is not of regular linear light, no diffraction of the light occurs and thus no interference pattern is formed, providing the liquid crystal display panel 6 with the bet performance of displaying.

The second surface 42 of the optic film 4 can be made roughened whereby after convergence caused by the first surface 41, the light can be made more uniform by the roughened second surface 42. Thus, a diffuser plate is commonly used in the conventional backlight modules can be eliminated. And, costs are reduced.

Figure 4:
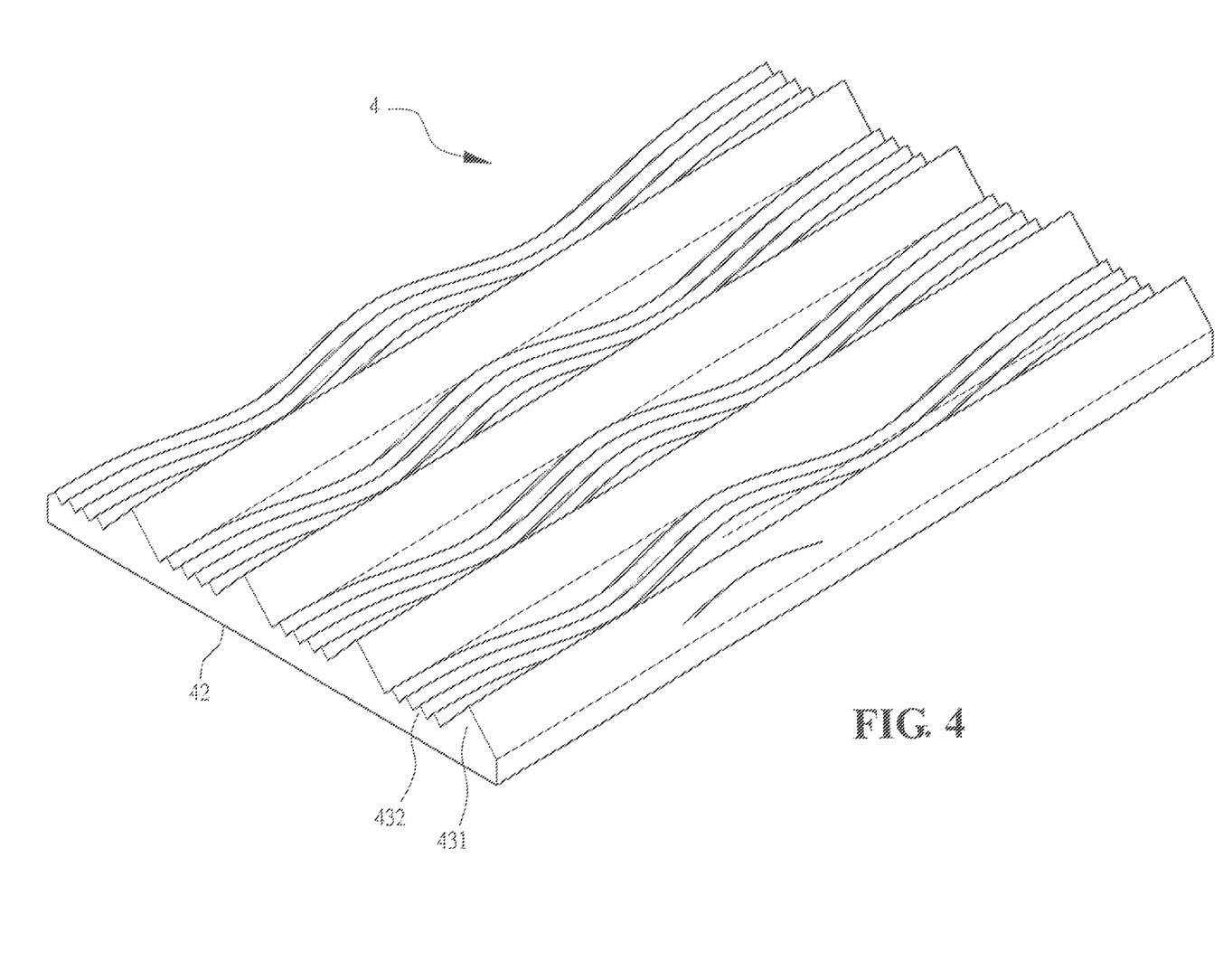
FIGS. 4 and 5 are perspective views of optic film constructed in accordance with different embodiments of the present invention having different arrangements of light guides of different volumes.
Figure 5:
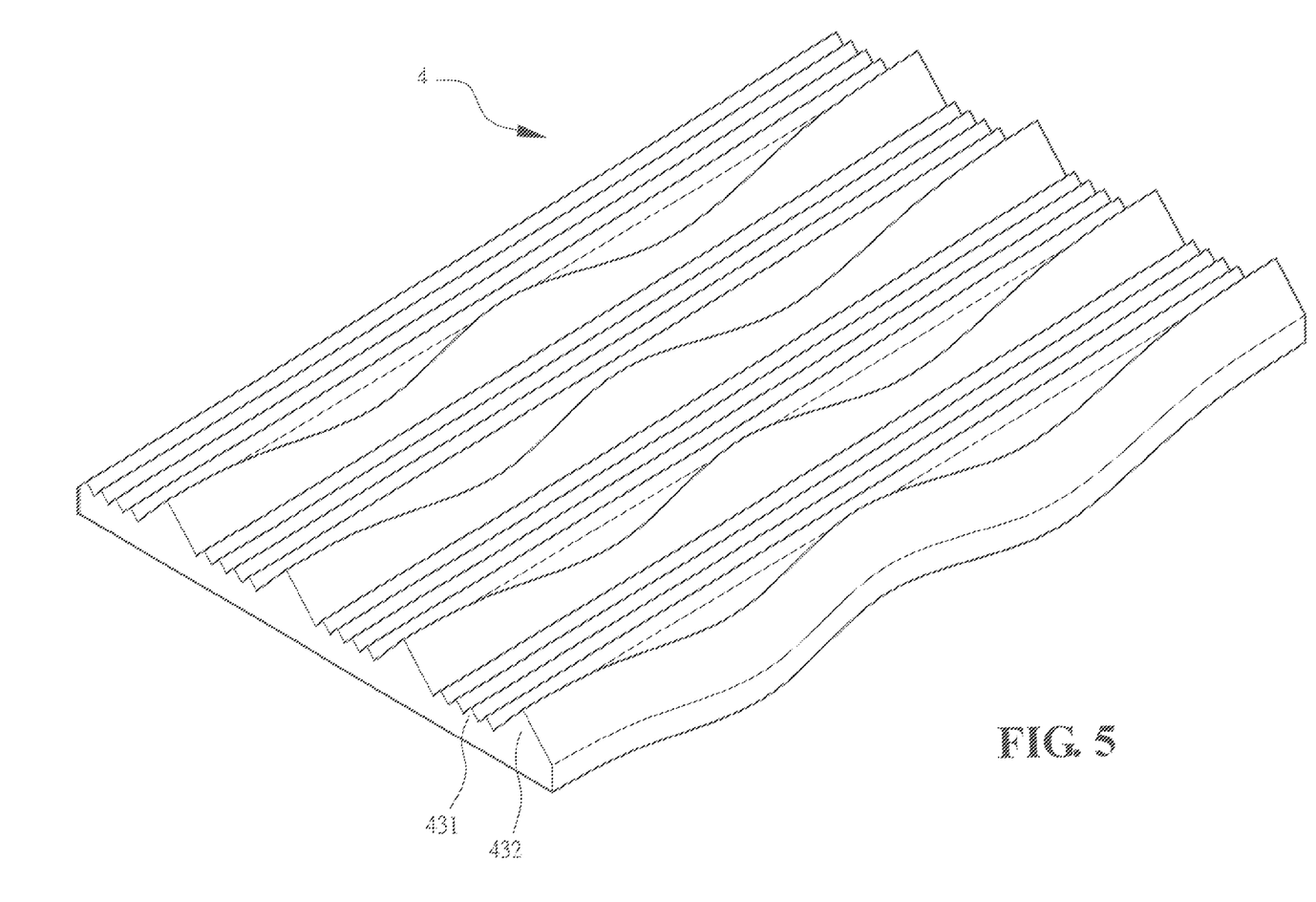

As shown in FIG. 4, to ensure better application of the optic film 4 of the present invention, the rib-like light guides 43 of the optic film 4 in accordance with the present invention are arranged in such a way that the straight linear light guides 431 are of a volume greater than the continuous left-and-right wavy light guides 432; or alternatively, as shown in FIG. 5, the straight linear light guides 431 are of a volume smaller than the continuous left-and-right wavy light guides 432, so that the pitch between rib-like light guides 43 is variable, and light emitted through the rib-like light guides 43 are of different spacing between light beams. The light beams distributed in a varied spacing manner transmit through the regular gaps among thin film transistors 61 and color filters 62 of the liquid crystal display panel 6 breaks the regularity so as to prevent light diffraction from occurring and thus eliminating interference patterns occurring in the liquid crystal display panel.

Figure 6:
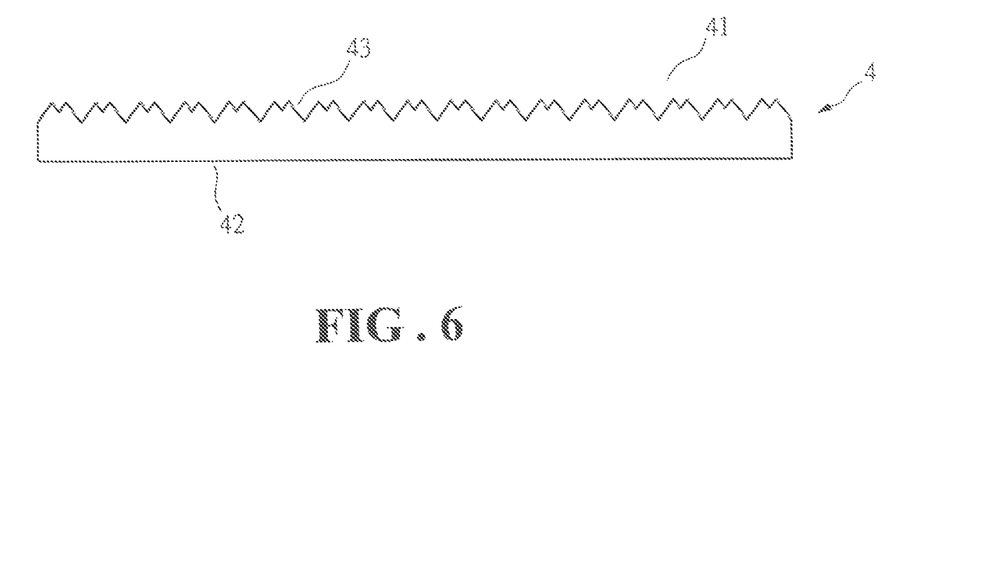
FIGS. 6-8 are end view illustrating optic films in accordance with the present invention having the light guides of different cross-sectional shapes.

Alternatively, as shown in FIG. 6, an apex of the rib-like light guide 43 is made recessed, such as a sharp angle recess in the drawing. With this arrangement, light transmitting through the rib-like light guide 43 is further split into beams having even smaller pitch therebetween, and regularity and consistency in pitch between emitted light beams are broken. Such an irregular distribution of light, which passing through the gaps among thin film transistors 61 and the color filters 62 of the liquid crystal display panel 6, helps breaking the regularity exhibited thereby and prevents occurrence of light diffraction and thus the occurrence of interference patterns in the liquid crystal display panel 6.

Figure 7:
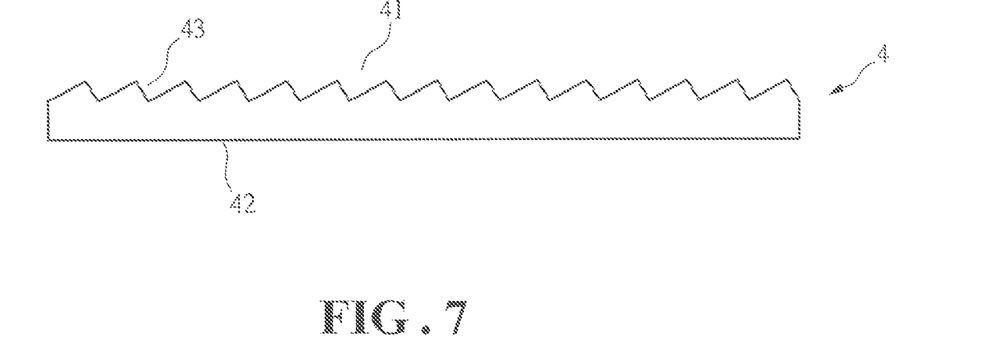
Figure 8:
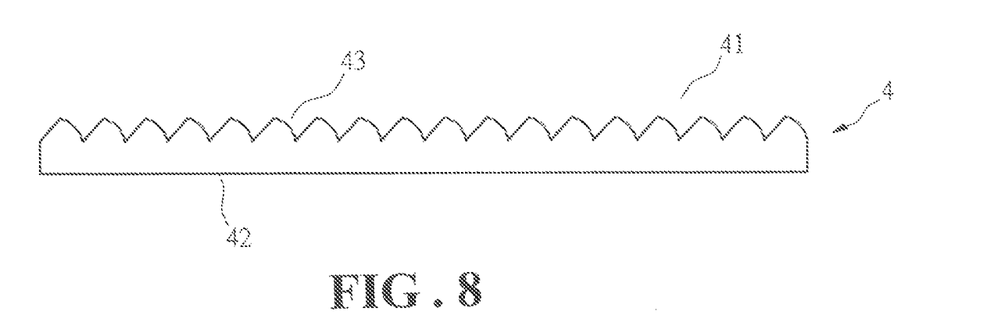

Further alternatively, as shown in FIG. 7, the rib-like light guide 43 of the optic film 4 in accordance with the present invention is configured so that two sloping edges of the light guide 43 are of inclinations of different angles. Thus, light transmitting through the light guide 43 can be of diffraction of different angles so that a component of the light is diffused as compared to the remaining component and distribution of different energy intensity is obtained. Alternatively, as shown in FIG. 8, one of the sloping edges of the rib-like light guide 43 is made curved, which provides enhanced convergence of the light component transmitting therethrough. Consequently, non-uniform distribution of energy intensity of the emitted light can be obtained. In other words, the light beam through the light guide 43 can be of portions of different energy intensity. This allows the light transmitting through the regularly arranged thin film transistors 61 and the color filters 62 of the liquid crystal display panel to break the regularity thereof and thus preventing occurring of diffraction of light. The liquid crystal display panel is protected from occurring of interference patterns thereon.

Figure 9:
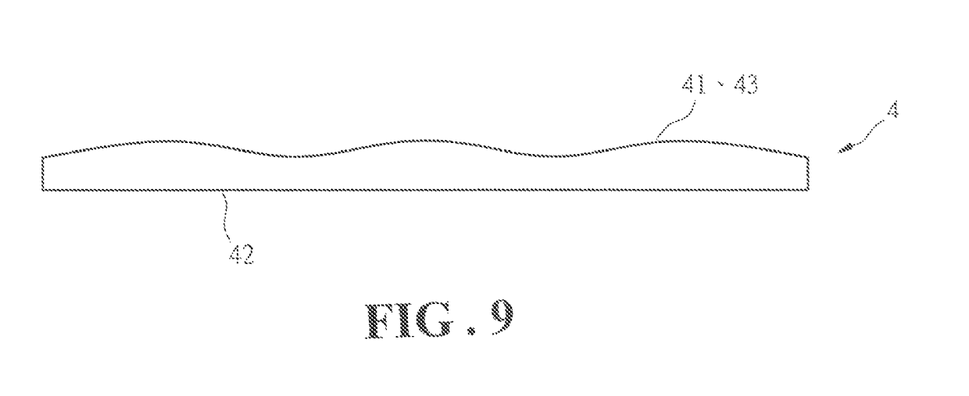
FIG. 9 is a side elevational view illustrating an optic film in accordance with the present invention having light guides having variable heights.

The embodiments of the present invention described above provide optic films 4 that are effective in preventing interference patterns from occurring in a liquid crystal display panel 6. As a further modification, which is shown in FIG. 9, the rib-like light guides 43 of the optic film 4 are made a configuration of continuous up-and-down height variation so that the variable height of the light guide 43 make different portions of the light beam away from the liquid crystal display panel 6 all different distances, in which portions of the light that are of short distances from the liquid crystal display panel 6 have higher optic energy than those of long distances from the liquid crystal display panel 6. Thus, energy intensity of the light projecting onto the liquid crystal display panel 6 is of variable distribution so that diffraction of light can be further suppressed to further ensure elimination of interference patterns on the liquid crystal display panel.

Although the present invention has been described with reference to the preferred embodiments thereof, it is apparent to those skilled in the art that a variety of modifications and changes may be made without departing form the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An optic film having a first surface and a second surface, wherein the first surface forms densely distributed rib-like light guides, of which a first number is of a straight linear configuration and a second number is of a continuous left-and-right wavy configuration, the rib-like light guides of the first and second numbers being arranged on a top of the first surface in a juxtaposing manner.

2. The optic film as claimed in claim 1, wherein the rib-like light guides have a length along which a height of the light guides is variable in a wavy configuration.

3. The optic film as claimed in claim 1, wherein the straight linear light guides have a volume greater than that of the continuous left-and-right wavy light guides.

4. The optic film as claimed in claim 3, wherein the rib-like light guides have a length along which a height of the light guides is variable in a wavy configuration.

5. The optic film as claimed in claim 1, wherein the straight linear light guides have a volume smaller than that of the continuous left-and-right wavy light guides.

6. The optic film as claimed in claim 5, wherein the rib-like light guides have a length along which a height of the light guides is variable in a wavy configuration.

7. The optic film as claimed in claim 1, wherein the rib-like light guides have an apex portion that is recessed.

8. The optic film as claimed in claim 7, wherein the rib-like light guides have a length along which a height of the light guides is variable in a wavy configuration.

9. The optic film as claimed in claim 1, wherein the rib-like light guides have two sloping edges which are of different inclinations, 10. The optic film as claimed in claim 9, wherein the rib-like light guides have a length along which a height of the light guides is variable in a wavy configuration.

11. The optic film as claimed in claim 1, wherein the rib-like light guides have two side edges of which one is curved.

12. The optic film as claimed in claim 11, wherein the rib-like light guides have a length along which a height of the light guides is variable in a wavy configuration.

13. The optic film as claimed in claim 1, wherein the second surface of the optic film is made rough.

14. A backlight module comprising:
a light guide board having at least a light incidence surface, a reflection surface, and a light emitting surface; and
an optic film having a first surface and a second surface, the first surface forming densely distributed rib-like light guides, of which a first number is of a straight linear configuration and a second number is of a continuous left-and-right wavy configuration, the rib-like light guides of the first and second numbers being arranged on a top of the first surface in a juxtaposing manner, the optic film being arranged on the light emitting surface of the light guide board with the first surface of the optic film opposing the light emitting surface of the light guide board.

15. The backlight module as claimed in claim 14, wherein the rib-like light guides have a length along which a height of the light guides is variable in a wavy configuration.

16. The backlight module as claimed in claim 14, wherein the straight linear light guides have a volume greater than that of the continuous left-and-right wavy light guides.

17. The backlight module as claimed in claim 16, wherein the rib-like light guides have a length along which a height of the light guides is variable in a wavy configuration.

18. The backlight module as claimed in claim 14, wherein the straight linear light guides have a volume smaller than that of the continuous left-and-right wavy light guides.

19. The backlight module as claimed in claim 18, wherein the rib-like light guides have a length along which a height of the light guides is variable in a wavy configuration.

20. The backlight module as claimed in claim 14, wherein the rib-like light guides have an apex portion that is recessed.

21. The backlight module as claimed in claim 20, wherein the rib-like light guides have a length along which a height of the light guides is variable in a wavy configuration.

22. The backlight module as claimed in claim 14, wherein the rib-like light guides have two sloping edges which are of different inclinations.

23. The backlight module as claimed in claim 22, wherein the rib-like light guides have a length along which a height of the light guides is variable in a wavy configuration.

24. The backlight module as claimed in claim 14, wherein the rib-like light guides have two side edges of which one is curved.

25. The backlight module as claimed in claim 24, wherein the rib-like light guides have a length along which a height of the light guides is variable in a wavy configuration.

26. The backlight module as claimed in claim 14, wherein the second surface of the optic film is made rough.

27. The backlight module as claimed in claim 14, wherein the light emitting surface of the light guide board of the backlight module forms a plurality of densely distributed prism-like light guides.

28. The backlight module as claimed in claim 14, wherein the light emitting surface of the light guide board of the backlight module forms a plurality of densely distributed prism-like light guides, which are extended in a direction that is substantially transverse to a direction along which the rib-like light guides of the optic film are arranged.

* * * * *